United States Patent [19]

Kruckemeyer et al.

[11] Patent Number: 5,715,680
[45] Date of Patent: Feb. 10, 1998

[54] HYDRAULIC POWER BOOSTER FOR A BRAKE APPLY SYSTEM

[75] Inventors: William Charles Kruckemeyer, Beavercreek; Michael Leslie Oliver, Xenia; James William Zehnder, II, Huber Heights; Gary Lee Johnston, Pleasant Hill, all of Ohio

[73] Assignee: General Motors Corporation, Detroit, Mich.

[21] Appl. No.: 746,819

[22] Filed: Nov. 18, 1996

[51] Int. Cl.⁶ .................................................. B60T 13/20
[52] U.S. Cl. ................................................. 60/552; 91/376 R
[58] Field of Search .......................... 60/547.1, 552; 91/376 R

[56] References Cited

U.S. PATENT DOCUMENTS

| | | | |
|---|---|---|---|
| 3,815,364 | 6/1974 | Belart et al. | 60/552 |
| 4,181,064 | 1/1980 | Flory | 91/6 |
| 5,150,575 | 9/1992 | Parker | 60/547.1 |
| 5,332,302 | 7/1994 | Maas | 303/114.1 |

*Primary Examiner*—Hoang Nguyen
*Attorney, Agent, or Firm*—Jeffrey A. Sedlar

[57] ABSTRACT

A hydraulic power booster for a brake apply system includes a mechanically actuated hydraulic booster of compact design that can be integrated in line with a conventional type master cylinder. Additionally, a combination of twin mechanically actuated check valves is arranged to provide a structure with essentially no leakage when the hydraulic booster is at rest and when the hydraulic booster is at poise. A mechanically actuated check valve is normally held open and is positioned in a passageway between the power piston and a fluid reservoir. This check valve is substantially, immediately closed upon the application of force to the brake pedal. Another mechanically actuated check valve is provided in a passageway between the hydraulic power supply and the power piston. This check valve is mechanically opened to supply a selected amount of pressurized fluid to the power piston which generates a selected amount of vehicle braking in response to actuation of the brake pedal.

6 Claims, 3 Drawing Sheets

HYDRAULIC POWER BOOSTER FOR A BRAKE APPLY SYSTEM

TECHNICAL FIELD

The present invention relates to a hydraulic power booster for a brake apply system and more particularly, to a hydraulic power booster with dual mechanically actuated check valves that provide positive shutoff features.

BACKGROUND OF THE INVENTION

Hydraulic power boosters for use in a vehicle brake apply system are well known. They typically comprise a unit that applies a pressurized fluid source to a slidable piston in order to generate force thereon in a selective manner. The amount of force applied to the system translates into a corresponding amount of vehicle brake application. Conventional hydraulic power boosters have been used for many years and have proven quite satisfactory. Generally, a conventional hydraulic booster includes a gas charged accumulator that stores a supply of fluid within a selected pressure range through the operation of a hydraulic pump that is switched on when the pressure reaches a selected lower limit. This is accomplished by transferring the fluid through the pump from a fluid reservoir into the accumulator which compresses the gas charge and causes the pressure to rise in the accumulator.

With such a system, when the brake pedal is depressed pressurized fluid from the accumulator acts on a power piston within the hydraulic booster to provide intensified force in operation of the master cylinder. The master cylinder generally operates to pressurize dual braking circuits in the associated vehicle. When the brake pedal is released, the fluid supplied from the accumulator to the power piston is cut off and any excess fluid is transferred back to the reservoir. As pedal applies reduce the pressure in the accumulator, the pump unit operates to maintain the pressure within the selected range.

In contemporary vehicles, available space under the hood is becoming increasingly tight. Therefore, conventional hydraulic boosters, which were often designed at a time when space was more readily available, may become difficult to use in some applications. Space limitations also effect the amount of room availability for the hydraulic power supply that is used in conjunction with the hydraulic booster. Accordingly, it is preferable to reduce the size of both the booster and the hydraulic power supply.

A certain amount of hydraulic leakage is a feature that is generally inherent to slidable piston type hydraulic devices. A desire to reduce the size of the hydraulic power supply means that this amount of leakage must be reduced or eliminated to the maximum extent possible. Therefore, a hydraulic power booster designed to be packaged within the limited space available in many of today's applications that operates with lower fluid flow requirements is needed. Such a hydraulic booster will preferably be reduced in physical size itself over conventional hydraulic boosters and additionally, include design features that provide the ability to operate with a lower capacity hydraulic power unit.

SUMMARY OF THE INVENTION

It is a goal of the present invention to provide a hydraulic power booster for a brake apply system of reduced physical size that provides tighter shutoff features when the hydraulic booster is not in use and when it reaches poise. In accordance with this goal the present invention provides a mechanically actuated hydraulic booster of compact design that can be integrated in line with a conventional type master cylinder. Additionally, a combination of twin mechanically actuated check valves is arranged to provide a structure with essentially no leakage when the hydraulic booster is at rest and also when the hydraulic booster is at poise.

Preferably, a hydraulic booster in accordance with the present invention includes a check valve that is normally held open and is positioned in a passageway between the power piston and the reservoir. This check valve is substantially, immediately closed upon the application of force to the brake pedal. Another mechanically actuated check valve is provided in a passageway between the hydraulic power supply and the power piston. This check valve is mechanically opened to supply a selected amount of pressurized fluid to the power piston and as a result, to generate a selected amount of vehicle braking in response to actuation of the brake pedal. During a brake application, when the hydraulic power booster reaches poise, i.e., when the system is hydraulically balanced and no further braking force is required, the check valve between the power piston and the reservoir remains closed and the check valve between the power supply and the power piston closes so that the flow of hydraulic fluid through the system is essentially shut off. Additionally, when the hydraulic power booster is at rest, the check valve between the power supply and the power piston is tightly closed to minimize or essentially eliminate internal system leakage. The power supply preferably maintains the availability of fluid pressure to the hydraulic booster within a range of approximately 2000–2500 psi. This amount of hydraulic pressure helps to maintain the check valve between the power supply and the power piston in a securely closed condition.

With more particularity, a hydraulic booster according to a preferred aspect of the present invention includes a body having a main bore with a power supply port and a reservoir port opening to the main bore. A power piston is slidably carried in the main bore with a power chamber formed in the main bore adjacent the power piston. A check valve is carried in the power piston and normally closes the power supply port off from the power chamber. A slidable cylinder is carried in the main bore and is slidable in concert with the power piston within the main bore. A mechanical actuator body is carried in the slidable cylinder and is slidable relative to the slidable cylinder. Another check valve is carried in the mechanical actuator body normally opening the power chamber to the reservoir port through the mechanical actuator body and the slidable cylinder. An input piston is slidably carried in the main bore and operates to selectively close this check valve.

DETAILED DESCRIPTION OF THE PRESENTLY PREFERRED EMBODIMENT

Figure 1:
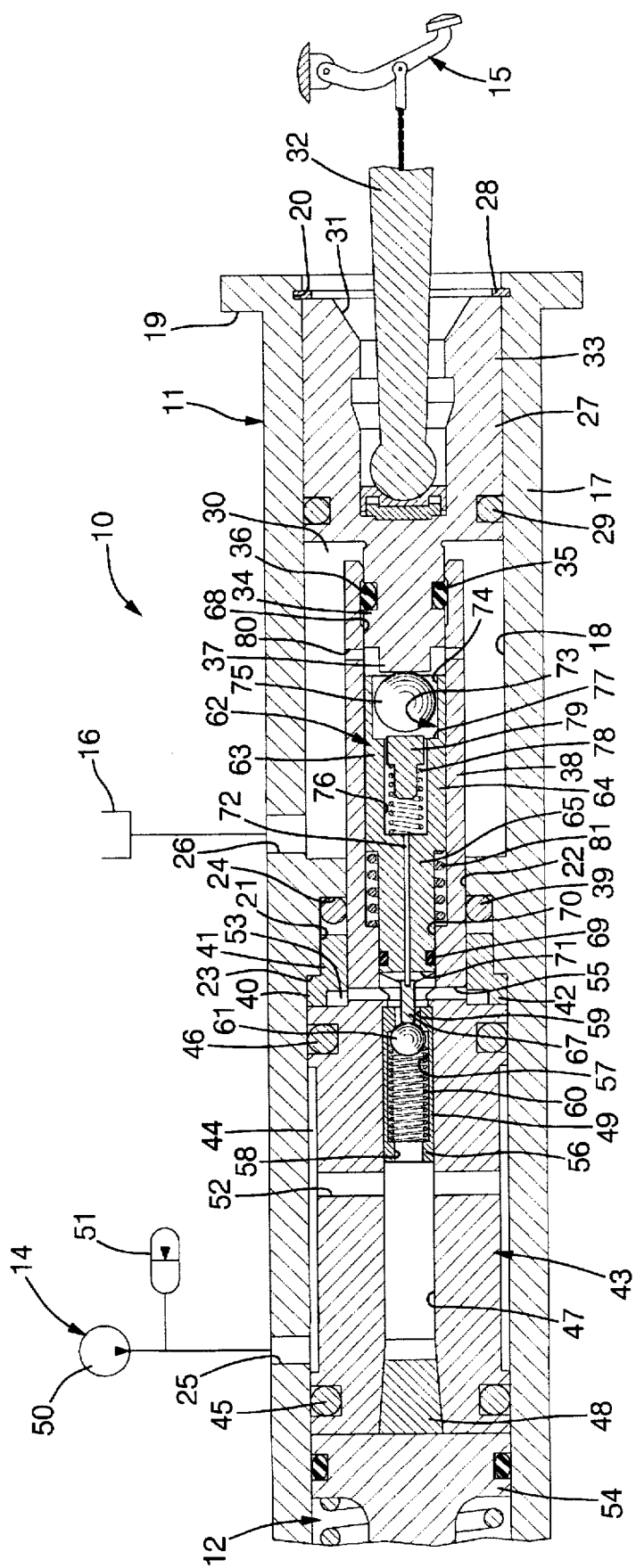
FIG. 1 is a fragmentary cross-sectional illustration of a hydraulic power booster for a brake apply system in accordance with the present invention shown in an at-rest position.

Referring to the drawings, illustrated in FIG. 1 is a portion of a brake apply system designated in the aggregate as 10.

The brake apply system 10 includes hydraulic power booster 11 and the master cylinder assembly 12. The hydraulic power booster 11 operates in conjunction with a hydraulic pressure supply 14, a fluid reservoir 16 and a mechanically actuated brake pedal 15. The hydraulic power booster 11 is commonly housed with the master cylinder assembly 12 in the present embodiment, although the units may be separately housed within the scope of the present invention.

With more specificity, hydraulic power booster 11 includes a body 17 formed of a suitably rigid material and includes a stepped bore 18 and a mounting flange 19. The stepped bore 18 includes an annular groove 20 and, first and second reduced diameter segments 21 and 22, respectively. The reduced diameter segment 21 forms an annular shoulder 23 and the reduced diameter segment 22 forms an annular shoulder 24. A power supply port 25 intersects the stepped bore 18 forward of shoulder 23 and a reservoir port 26 intersects the stepped bore 18 rearward of reduced diameter segment 22.

A slidable input piston 27 is retained in stepped bore 18 by ring 28 and carries an annular seal 29 sealing the rearward end of annular chamber 30, which is continuously open through the reservoir port 26 to the reservoir 16. The input piston 27 includes a bore 31 that captures push-rod 32. Push-rod 32 is connected to brake pedal 15 for transferring manual inputs therefrom to the input piston 27. The input piston 27 includes a first section 33 which has a diameter that is substantially the same as the diameter of the stepped bore 18 so that the input piston 27 smoothly slides therein. The input piston 27 also includes an integral second section 34 with a diameter significantly less than that of the first section 33. The second section 34 includes an annular groove 35 which carries a seal 36. The second section 34 also includes an extension 37 that has a diameter less than the diameter of the second section 34.

The second section 34 of the input piston 27 is received within slidable cylinder 38 which is carried by the body 17 at reduced diameter segment 22 of the stepped bore 18. A seal 39 is positioned between the slidable cylinder 38 and the body 17 at reduced diameter segment 21 of stepped bore 18. A ferrule-shaped stop 40 is positioned partly within the reduced diameter segment 21 against annular shoulder 23 and assists annular body 41 in supporting the slidable cylinder 38. The stop 40 maintains the seal 39 in position near the annular shoulder 24. The stop 40 also includes an annular leg 42 which provides a rearward travel limit for the slidable power piston 43.

The power piston 43 is substantially spool-shaped and includes an undercut segment forming annular chamber 44 that is continuously in registry with the power supply port 25. The power piston 43 carries seals 45 and 46 which provide a fluid seal for the forward and rearward ends of the annular chamber 44. Power piston 43 also includes a central bore 47 that is closed at its forward end by a plug 48 and which carries a valve assembly 49 at its rearward end.

A selective amount of force is applied to the power piston 43 by operation of the power supply 14. Power supply 14 includes a pump 50 and an accumulator 51 which maintain an available pressurized fluid source preferably within the range of 2000-2500 psi. This pressurized fluid is continuously available to the annular chamber 44 and to the central bore 47 through the transverse bore 52 of power piston 43. The valve assembly 49 selectively permits the transmission of the pressurized fluid supply to the power chamber 53 to provide power assist in movement of the slidable primary master cylinder piston 54 which is positioned adjacent the power piston 43 in the stepped diameter bore 18.

The valve assembly 49 includes an insert 56 that is pressed into the central bore 47 between the transverse bore 52 and the power chamber 53. The insert 56 includes a bore 57 with a stop 58 and a valve seat 59. Within the insert 56, a spring 60 bears against the stop 58 and normally urges the ball 61 against the valve seat 59 to securely close off the central bore 47 from the power chamber 53. The valve assembly 49 is selectively opened by means of mechanical actuator assembly 62 which is carried by slidable cylinder 38.

The mechanical actuator assembly 62 includes a body 63 that is slidably carried in the slidable cylinder 38. The body 63 includes a support segment 64 with an integral seal segment 65 having an integral extension 67. The support segment 64 slidably bears against the interior surface of slidable cylinder 38 within the bore 68. The seal segment 65 carries a seal 69 which sealingly and slidably bears against the reduced diameter segment 70 of bore 68. The extension 67 extends out from the slidable cylinder 38 and enters the valve seat 59 engaging the ball 61.

The bore 68 is opened to the power chamber 53 about the extension 67. A transverse bore 71 extends through the body 63 at the juncture between seal segment 65 and the extension 67. A longitudinal passage 72 is formed through the body 63 intersecting the transverse bore 71 and the stepped longitudinal bore 73. The stepped longitudinal bore 73 includes a first segment 74 which carries a ball 75 and a second segment 76 with a diameter smaller than the diameter of the first segment 74. A valve seat 77 is formed at the juncture between the first and second segments 74 and 76 of the stepped longitudinal bore 73. A spring 78 and support 79 are carried in the second segment 76 of the stepped longitudinal bore 73 and normally bias the ball 75 away from the valve seat 77 and against the extension 37 of input piston 27. This provides a normally open passage between the power chamber 53 and the reservoir 16 through the bore 55 in slidable cylinder 38, transverse bore 71, longitudinal passage 72, second segment 76, valve seat 77, first segment 74, past the extension 37 and through a plurality of transverse openings 80 that are formed in the slidable cylinder 38. Fluid is transferred between the chamber 30 and the reservoir 16 through the reservoir port 26.

Figure 2:
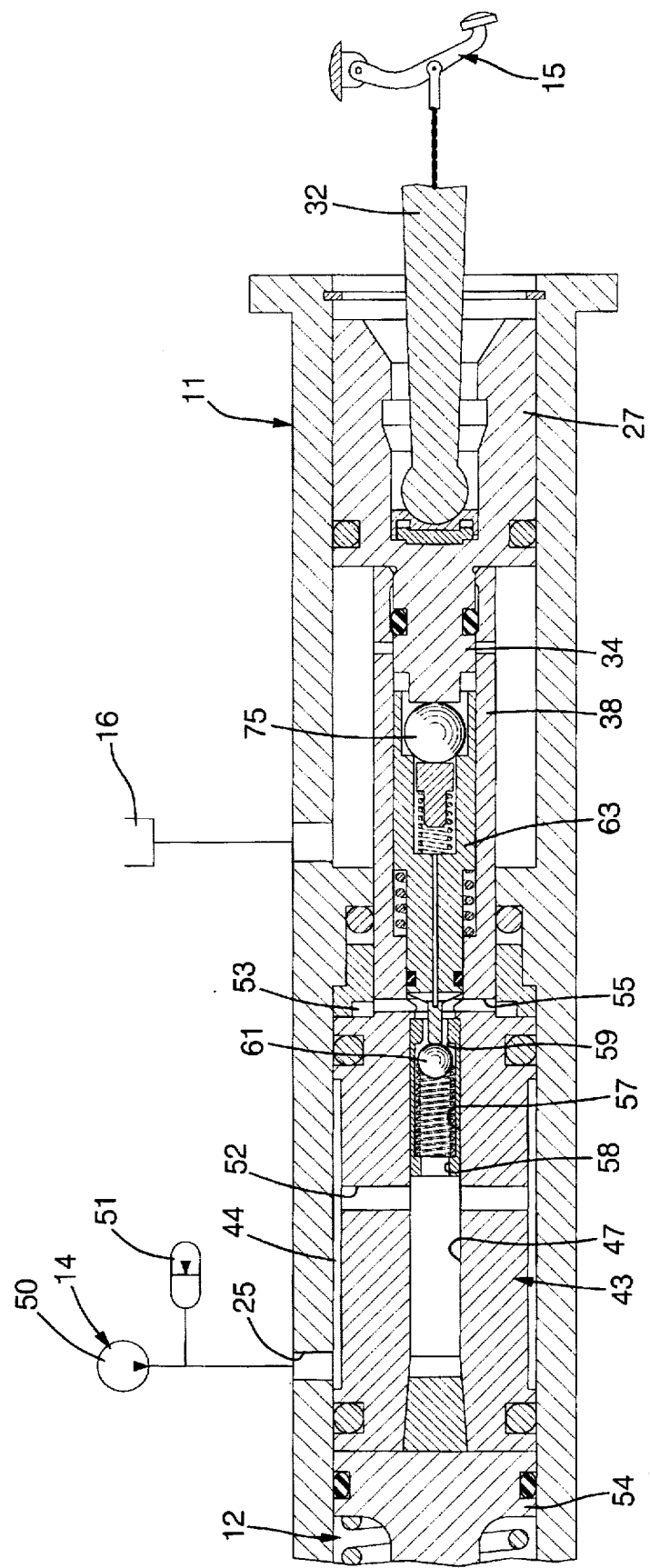
FIG. 2 is a fragmentary cross-sectional illustration of the hydraulic power booster of FIG. 1 shown in a brake apply position.

In operation of the brake apply system 10, the application of force to the brake pedal 15 is transferred through the push-rod 32 to the input piston 27. The extension 34 of the input piston 27 initially slides relative to the slidable cylinder 38 forcing ball 75 against the ball seat 77 closing the power chamber 53 off from the reservoir 16 as shown in FIG. 2. As this occurs the body 63 slides under the input force of the brake pedal 15 unseating the ball 61 and opening a fluid passage between the power supply 14 and the power chamber 53 as seen in FIG. 2. This fluid passage extends through the power supply port 25, the annular chamber 44, transverse bore 52, central bore 47, stop 58, bore 57, valve seat 59 and cross bore 55.

Figure 3:
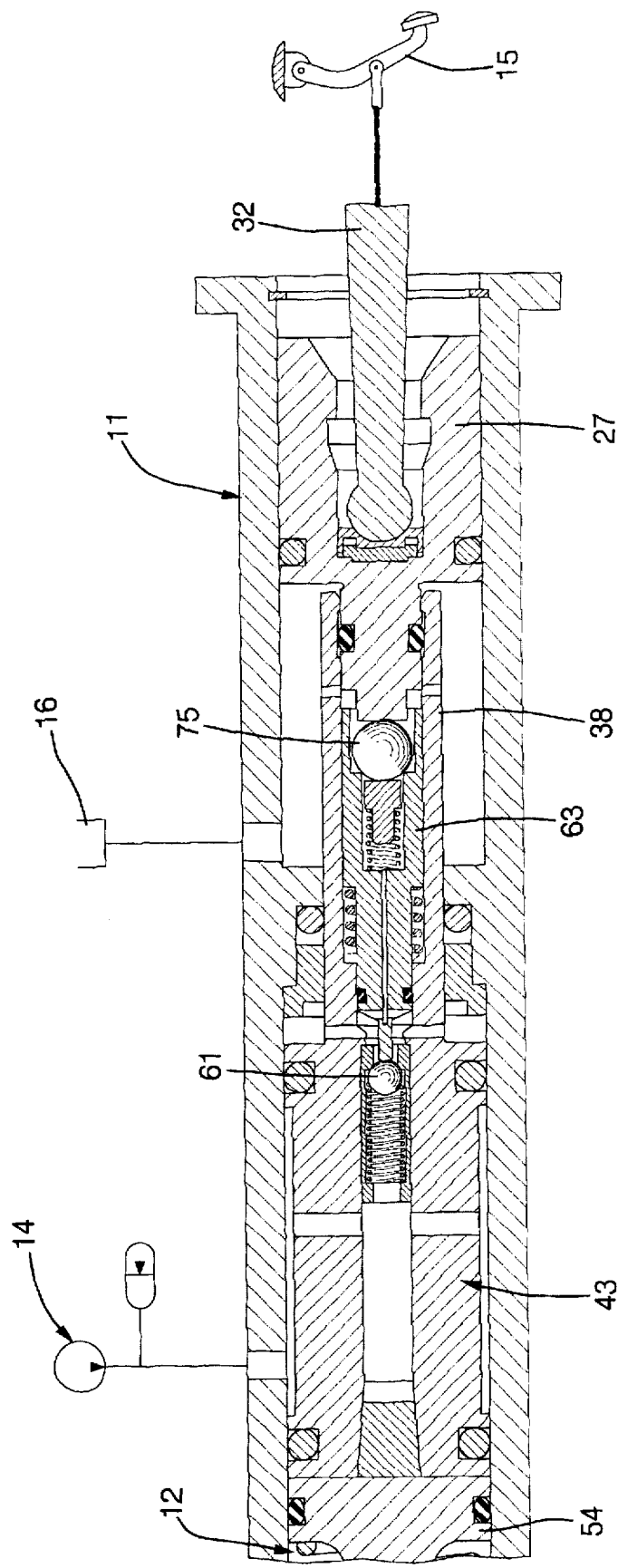
FIG. 3 is a fragmentary cross-sectional illustration of the hydraulic power booster of FIG. 1 shown in an at-poise position.

Force feedback provided by the primary master cylinder 54 balances the input force from the brake pedal 15 when the system is at-poise as shown in FIG. 3. In combination, the power piston 43 and integral slidable cylinder 38 will automatically be positioned such that the ball 61 re-seats against the valve seat 59 with the ball 75 remaining seated against the valve seat 77, until a change in force input on the brake pedal 15 occurs. This cuts off fluid flow through the hydraulic booster 11 reducing the requirement of generating such flow from the power supply 14.

When the brake pedal 15 is released the ball 61 re-seats against the valve seat 59 closing off the power chamber 53 from the power supply 14 while the spring 78 and support 79 unseat the ball 75 opening a fluid passage between the power chamber 53 and the reservoir 16 to release fluid pressure therefrom, as shown in FIG. 1. The spring 81 biases the body 63 toward the input piston 27 causing the extension 67 to retract from the valve seat 59 for secure closure of the ball 61 against the valve seat 59 under the force of spring 60 and the fluid force generated by pump 50.

What is claimed is:

1. A hydraulic booster comprising:

a body having a main bore with a power supply port opening to the main bore and a reservoir port opening to the main bore;

a power piston slidably carried in the main bore defining an annular chamber in the main bore that is continuously open to the power supply port with a power chamber formed in the main bore adjacent the power piston;

a passageway formed in the power piston and extending between the annular chamber and the power chamber;

a first valve carried in the passageway of the power piston and normally closing the power supply port off from the power chamber;

a slidable cylinder slidably carried in the main bore wherein the slidable cylinder and power piston are slidable in concert within the main bore;

a mechanical actuator body carried in the slidable cylinder wherein the mechanical actuator body is slidable relative to the slidable cylinder;

a second valve carried in the mechanical actuator body normally opening the power chamber to the reservoir port through the mechanical actuator body and the slidable cylinder; and an input piston slidably carried in the main bore having an extension slidably carried in the slidable cylinder wherein the extension continuously engages the second valve, wherein the first valve includes an insert positioned in the passageway of the power piston wherein the insert includes a bore forming a segment of the passageway and includes a valve seat, with a ball carried in the bore and being biased toward the valve seat.

2. A hydraulic booster according to claim 1 wherein the mechanical actuator body includes an integral extension that engages the ball and operates to open a flow path from the power supply port to the power chamber when the mechanical actuator body slides.

3. A hydraulic power booster according to claim 1 wherein the ball is biased toward the valve seat by a spring in combination with fluid pressure in the passageway.

4. A hydraulic booster comprising:

a body having a main bore with a power supply port opening to the main bore and a reservoir port opening to the main bore;

a power piston slidably carried in the main bore defining an annular chamber in the main bore that is continuously open to the power supply port, with a power chamber formed in the main bore adjacent the power piston;

a passageway formed in the power piston and extending between the annular chamber and the power chamber;

a first valve carried in the passageway of the power piston and normally closing the power supply port off from the power chamber;

a slidable cylinder slidably carried in the main bore wherein the slidable cylinder and power piston are slidable in concert within the main bore;

a mechanical actuator body carried in the slidable cylinder and having a longitudinal passage opening to the power chamber through a transverse bore wherein the mechanical actuator body is slidable relative to the slidable cylinder;

a second valve carried in the mechanical actuator body normally opening the power chamber to the reservoir port through the mechanical actuator body and the slidable cylinder wherein the second valve includes a valve seat formed about the longitudinal passage and a ball biased away from the valve seat so that the power chamber is normally open to the reservoir port through the longitudinal passage and the valve seat; and an input piston slidably carried in the main bore having an extension slidably carried in the slidable cylinder wherein the extension continuously engages the second valve.

5. A hydraulic booster according to claim 4 wherein the second valve is closed when the input piston slides within the main bore.

6. A hydraulic booster according to claim 5 further comprising a brake pedal and a rod extending between the brake pedal and the input piston wherein the second valve is selectively closed by an application of force on the brake pedal.

* * * * *